US011601482B2

(12) United States Patent
Han

(10) Patent No.: US 11,601,482 B2
(45) Date of Patent: Mar. 7, 2023

(54) METHODS AND APPARATUS FOR PERFORMING VIRTUAL RELOCATION DURING A NETWORK CONFERENCE

(71) Applicant: Zoom Video Communications, Inc., San Jose, CA (US)

(72) Inventor: Lin Han, Los Altos, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/106,036

(22) Filed: Nov. 27, 2020

(65) Prior Publication Data

US 2022/0174098 A1 Jun. 2, 2022

(51) Int. Cl.
| | |
|---|---|
| *H04L 65/1089* | (2022.01) |
| *H04L 65/75* | (2022.01) |
| *H04L 65/1093* | (2022.01) |
| *H04L 65/403* | (2022.01) |
| *H04N 7/15* | (2006.01) |

(52) U.S. Cl.
CPC ...... *H04L 65/1089* (2013.01); *H04L 65/1093* (2013.01); *H04L 65/403* (2013.01); *H04L 65/75* (2022.05); *H04N 7/152* (2013.01)

(58) Field of Classification Search
CPC ............. H04L 65/1089; H04L 65/1093; H04L 65/403; H04L 65/601; H04N 7/152
USPC ........................................................ 709/204
See application file for complete search history.

(56) References Cited

U.S. PATENT DOCUMENTS

| | | | |
|---|---|---|---|
| 9,576,607 | B2 | 2/2017 | Leske |
| 9,756,288 | B2 | 9/2017 | Huber et al. |
| 10,158,827 | B2 | 12/2018 | Cahill et al. |
| 10,600,169 | B2 | 3/2020 | Yamasaki et al. |

(Continued)

FOREIGN PATENT DOCUMENTS

JP 2005094696 A 4/2005

OTHER PUBLICATIONS

Dominic Kent, Microsoft Teams Together Mode: Your Questions Answered, Aug. 19, 2020, dispatch.m.io, https://web.archive.org/web/20201008013221/https://dispatch.m.io/microsoft-teams-together-mode/ (Year: 2020).*

(Continued)

*Primary Examiner* — Zi Ye

(74) *Attorney, Agent, or Firm* — Kilpatrick Townsend & Stockton LLP

(57) ABSTRACT

Methods and apparatus for performing virtual relocation during a network conference. In an embodiment, a method is provided for relocating a conference participant during a network conference. The method includes receiving, at a first conference participant, video streams from one or more additional conference participants, and identifying a video stream of a selected conference participant. The method also includes transmitting a request to the selected conference participant to remove a background from the video stream of the selected conference participant to generate a modified video stream, and receiving the modified video stream from the selected conference participant. The method also includes relocating the modified video stream in a background of the first conference participant, and transmitting an instruction for relocating the modified video stream within the background of the first conference participant.

17 Claims, 7 Drawing Sheets

(56) References Cited

U.S. PATENT DOCUMENTS

| | | | |
|---|---|---|---|
| 10,609,332 B1 | 3/2020 | Turbell | |
| 10,728,194 B2 | 7/2020 | Pell | |
| 11,363,088 B1 | 6/2022 | Han | |
| 2010/0302446 A1 | 12/2010 | Mauchly et al. | |
| 2012/0281059 A1* | 11/2012 | Chou | H04N 7/147 |
| | | | 348/14.07 |
| 2016/0150187 A1* | 5/2016 | Fadili | H04N 7/157 |
| | | | 348/14.08 |
| 2016/0210998 A1* | 7/2016 | Leske | G11B 27/031 |
| 2020/0151962 A1 | 5/2020 | Holmes | |

OTHER PUBLICATIONS

Tony Redmond, Microsoft Improves Teams Together Mode with New Background Scenes, Nov. 11, 2020, https://office365itpros.com, https://office365itpros.com/2020/11/11/microsoft-improves-teams-together-mode-new-scenes/ (Year: 2020).*

Susanna Ray, Video fatigue and a late-night host with no audience inspire a new way to help people feel together, remotely, Jul. 8, 2020, microsoft.com, https://news.microsoft.com/innovation-stories/microsoft-teams-together-mode/ (Year: 2020).*

U.S. Appl. No. 17/106,040 , Notice of Allowance, dated Nov. 16, 2021, 9 pages.

U.S. Appl. No. 17/106,040 , Notice of Allowance, dated Feb. 10, 2022, 9 pages.

International Application, International Search Report and Written Opinion, PCT/US2021/060937, dated Mar. 17, 2022, 13 pages.

* cited by examiner

INSTRUCTION = [ A1(X1, Y1, SIZE 1); A2(X2, Y2, SIZE2) .......]

METHODS AND APPARATUS FOR PERFORMING VIRTUAL RELOCATION DURING A NETWORK CONFERENCE

CROSS-REFERENCE TO RELATED APPLICATIONS

The present application contains subject matter that may be related to the subject matter in U.S. patent application Ser. No. 17/106,040 entitled "METHODS AND APPARATUS FOR RECEIVING VIRTUAL RELOCATION DURING A NETWORK CONFERENCE" filed on Nov. 27, 2020, now U.S. Pat. No. 11,303,088 issued Jun. 14, 2022 and assigned to the assignee of the present application.

FIELD

The exemplary embodiments of the present invention relate to the field of network communication. More specifically, the exemplary embodiments of the present invention relate to virtual relocation during a network conference.

BACKGROUND

With the increasing popularity of digital electronics and network communications, real-time interactive network conferences (or meetings) have become more popular. For example, network conferencing applications now allow people to communicate with each other from remote locations to exchange audio and video in real time.

During a network conference, each meeting attendee transmits video and audio streams to other attendees. An attendee video stream includes an attendee image within an attendee background. All the video streams received at a conference participant are typically displayed in a series of video boxes or regions where each box displays one video stream. However, network conferences are now being conducted for all types of events, such as holiday parties, weddings, and other types of events. Displaying individual video boxes may not express the content and emotion of the underlying events, since the participants are displayed at different areas of the display screen and with different backgrounds.

SUMMARY

In various embodiments, methods and apparatus are disclosed for providing virtual relocation during a network conference. In an embodiment, a network conference is established between a host device and one or more attendee devices. Audio and video streams are exchanged between the participants of the conference. The host transmits a video stream that includes a host image and a host background. In an embodiment, one or more of the attendees are virtually relocated to appear within the host background.

During virtual relocation of an attendee, the host transmits a request to the attendee requesting that the attendee remove a background from the video stream transmitted from the attendee. In response to the request, the attendee removes the background from its video stream to generate a modified video stream that is transmitted to the host and one or more attendees of the conference. The host receives the modified video stream and relocates the stream within the host background on the host system. In relocating the modified stream within the host background, the host may position, resize, rotate, or adjust the modified attendee stream in any way.

After the host has relocated the attendee stream within the host background, the host generates an instruction that includes parameters that describe the position, size, orientation, and any other characteristics of the relocated attendee stream. The host transmits the instruction to the attendee and one or more other conference participants.

At the attendee device, the instruction is received and the host video stream is displayed. The modified attendee stream is relocated within the host background according to the position and size parameters included in the received instruction. Each participant receiving the modified attendee stream and the instruction also relocates the attendee stream to appear within the host background according to the parameters included in the instruction. Conference participants now see the attendee appearing within the host background. Thus, the attendee has been effectively, "teleported" to the host location. The same processes can be used to teleport any number of conference participants into the host background. Virtual relocation provided by the disclosed embodiments is extremely efficient since relocation is performed at each device thereby distributing image processing operations and reducing network bandwidth requirements.

In an embodiment, a method is provided for relocating a conference participant during a network conference. The method comprises receiving, at a first conference participant, video streams from one or more additional conference participants, and identifying a video stream of a selected conference participant. The method also comprises transmitting a request to the selected conference participant to remove a background from the video stream of the selected conference participant to generate a modified video stream, and receiving the modified video stream from the selected conference participant. The method also comprises relocating the modified video stream in a background of the first conference participant, and transmitting an instruction for relocating the modified video stream within the background of the first conference participant.

In an embodiment, a host apparatus is provided for relocating a conference participant during a network conference. The host apparatus comprises a transceiver configured to transmit and receive information with conference participants during a network conference. The host apparatus also comprises a processor configured to: generate a host video stream the includes a host background; receive a participant video stream associated with a selected conference participant; transmit a request to remove a background from the participant video stream to generate a modified video stream; receive the modified video stream; relocate the modified video stream within the host background; and transmit an instruction for relocating the modified video stream within the host background.

In an embodiment, A non-transitory computer readable medium is provided on which are stored program instructions that, when executed by one or more processors, cause the one or more processors to perform operations of: receiving, at a first conference participant, video streams from one or more conference participants; identifying a video stream of a selected conference participant; transmitting a request to the selected conference participant to remove a background from the video stream of the selected conference participant to generate a modified video stream; receiving the modified video stream from the selected conference participant; relocating the modified video stream in a background of the first conference participant; and transmitting an instruction for relocating the modified video stream within the background of the first conference participant.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
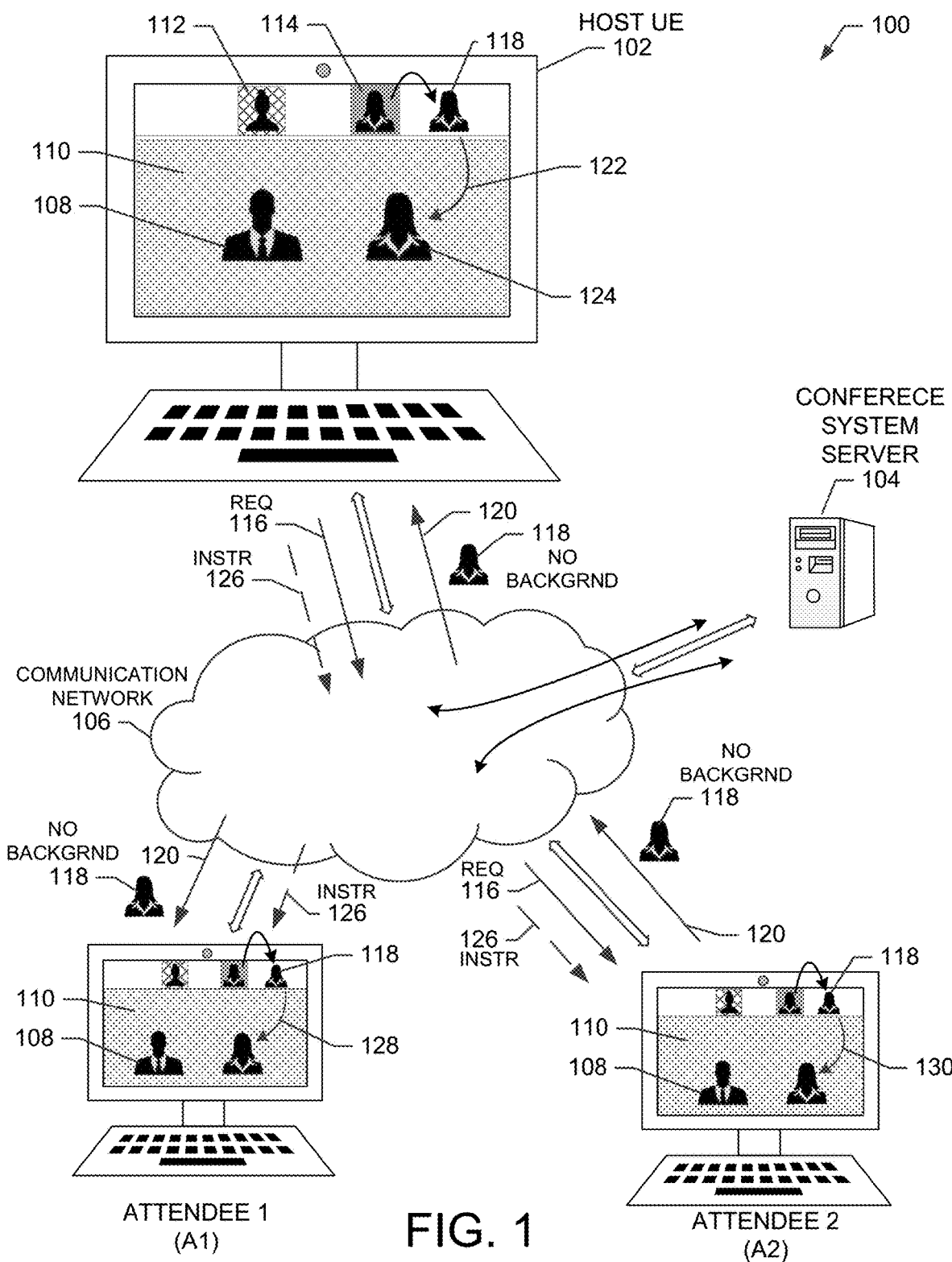
FIG. 1 shows a diagram illustrating a communication network that provides exemplary embodiments of virtual relocation for use during a network conference.

Embodiments of the present invention include methods and apparatus for providing virtual relocation of participants during a network conference.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine, it is understood that those process steps can be stored as a series of instructions readable by the machine or computer for execution. The instructions may be stored on a tangible medium, such as a computer memory device, including but not limited to magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram illustrating a communication network 100 that provides exemplary embodiments of virtual relocation for use during a network conference. The communication network 100 comprises first user equipment (UE) 102, which is referred to as a host UE that acts as a host for the network conference. The network 100 also comprises attendee user equipment (A1-A2) that participant in the network conference. The conference participants (e.g., host 102 and attendees (A1-A2)) are configured to communicate with each other utilizing a conference system server 104 and communication network 106. In an embodiment, the conference system server 104 facilitates communication of audio, video, and other types of information between the participants during the network conference. In an embodiment, the communication network 106 comprises a wired communication network, a wireless communication network, or a combination of wired and wireless communication networks.

During a conference, the host 102 communicates a host video stream having a host image 108 and host background 110 to the attendees (A1-A2). The attendees (A1-A2) also communicate attendee video streams having attendee images and attendee backgrounds to each other and the host 102. For example, the host 102 receives an attendee A1 video stream 112 and an attendee A2 video stream 114, and displays these streams in small display boxes or regions within a top portion of the host display screen. The attendees (A1-A2) receive the host video stream and display the host image and host background within a large lower region of their respective display screens.

During the conference, the host 102 performs virtual relocation to relocate the attendee A2 to appear within the host background 110. In effect, the attendee A2 will be "teleported" to the host location and appear with the host image within the host background to enhance the user experience provided during the conference. In various embodiments, any number of attendees can be virtually relocated to appear with the host image within the host background. In an embodiment, the following operations are performed to relocate the attendee A2 to appear with the host image 108 within the host background 110.

1. After a network conference has begun, the host 102 transmits a request 116 to the attendee A2 requesting that the attendee A2 remove the background in the attendee A2 video stream 114.

2. In response to the request, the attendee A2 removes the background in the attendee video stream 114 to generate a modified attendee video stream 118 that has the background removed. The attendee A2 utilizes any suitable process to remove the background from the attendee A2 video stream to generate the modified attendee video stream 118.

3. The attendee A2 transmits the modified video stream 118 to the host 102 and the attendee A1, as indicated by communication 120.

4. The host 102 receives the modified video stream 118 in place of the original attendee video stream 114. The host relocates the modified video stream 118 to appear within the host background 110. For example, the host 102 moves the modified video stream 118 to the host background 110, as indicated at 122. During the relocation, the position and size characteristics of the modified video stream 118 within the host background 110 can be modified.

5. The host generates and transmits an instruction 126 to the attendees (A1-A2) that includes parameters identifying the position, size, orientation, and other characteristics of the modified video stream 118 as it appears within the host background 110.

6. The attendees (A1-A2) relocate the modified video stream 118 to appear within the host background 110 based on the position and size parameters provided in the instruction 126. For example, the attendee A1 relocates the modified video stream 118 to appear in the host background 110, as indicated at 128. The attendee A2 relocates the modified video stream 118 to appear in the host background 110, as indicated at 130.

As a result of the operations above, the attendee A2 is virtually relocated to appear with the host image 108 within the background 110 of the host 102. For example, if the background 110 is an office setting, the image of the attendee A2 will appear within the office setting of the host. In effect, the image of attendee A2 is "teleported" to the host location to enhance the user experience of the conference. Any number of attendees can be relocated to appear within the host background 110. In another embodiment, the host 102 provides authorization to allow a selected conference attendee to perform the virtual relocation operations to relocate any of the conference participant to the selected attendee's background. Thus, any of the conference participants can be authorized to act as a "host" to perform the above described relocation operations. More detailed descriptions of the various implementations and operations the host 102 and attendees (A1-A2) to provide virtual relocation during a network conference are provided below.

Figure 2:
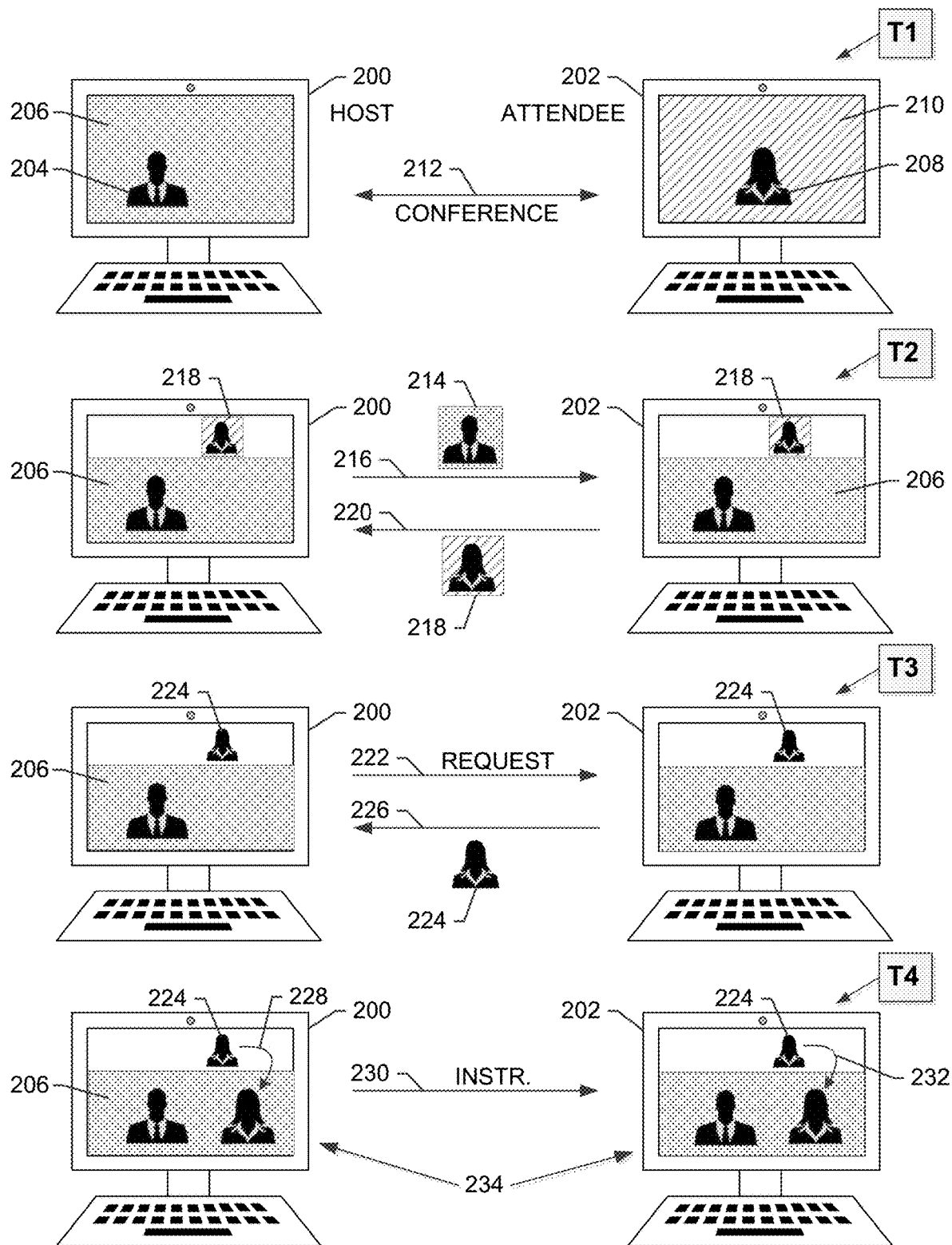
FIG. 2 shows a diagram that illustrates operations of conference participants to perform virtual relocation during a network conference.

FIG. 2 shows a diagram that illustrates operations of conference participants to perform virtual relocation during a network conference. As illustrated in FIG. 2, four transactions (T1-T4) are shown. The transactions occur between a conference host 200 and a conference attendee 202 during a network conference. It will be assumed that the conference host 200 performs an embodiment of virtual relocation to relocate the conference attendee 202 to appear with the host image within the host background. For example, a background 206 of the conference host 200 may be an office environment, and the host 200 wishes to relocate the attendee 202 to appear with the host within the office environment.

At transaction T1, the host 200 UE displays an image of a host user 204 and the host background 206. The attendee 202 UE displays an image of an attendee user 208 and an attendee background 210. The host 200 UE and the attendee 202 UE enter into a network conference 212.

At transaction T2, the host 200 and attendee 202 exchange video streams during the network conference 212. For example, the host 200 transmits host stream 214 to the attendee 202, as indicated at 216. The host stream 214 includes the host image 204 and the host background 206. The attendee 202 transmits attendee stream 218 to the host 200, as indicated at 220. The attendee stream 218 includes the attendee image 208 and the attendee background 210. After this exchange, the host 200 displays the attendee stream 218 within a top portion of the host display. The host 200 displays the host stream 214 within a main portion of the host display. The attendee 202 displays the host stream 214 in a main portion of the attendee display. The attendee 202 displays the attendee stream 218 within a top portion of the attendee display.

At transaction T3, the host 200 desires to relocate the attendee 202 to appear with the host image 204 within the host background 206. The host 200 transmits a request 222 to the attendee 202 requesting that the attendee remove the background 210 from the attendee video stream 218. The attendee 202 performs a background removal operation to remove the background 210 from the attendee stream 218 to generate a modified attendee stream 224 in which the background is removed. The attendee 202 transmits the modified attendee stream 224 to the host 200, as indicated at 226. Both the host 200 and the attendee 202 display the modified attendee stream 224 within a top portion of their respective displays.

At transaction T4, the host 200 virtually relocates or moves the modified attendee stream 224 so that the attendee image 208 appears with the host image 204 within the host background 206. At indicated at 228, the modified attendee stream 224 is moved to appear within the host background 206. During the relocation process 228, the modified attendee stream 224 is moved to a particular location (X,Y) within the host background 206 and may be resized, rotated, and/or otherwise modified to appear within the host background 206.

The host 200 generates and transmits an instruction 230 to the attendee 202 that instructs the attendee as to how the modified attendee stream 224 is to be relocated within the host background 206. The attendee 202 then relocates the modified attendee stream 224 to appear within the host background 206, as indicated at 232. During the relocation process 232, the modified attendee stream 224 is moved to the particular location (X,Y) within the host background 206 and may be resized, rotated, and/or otherwise modified to appear within the host background 206 based on the received instruction 230. As a result of the virtual relocation, the host 200 and the attendee 202 both display the modified attendee stream 224 within the background 206 of the host 200, as indicated at 234. Thus, the attendee image 208 is effectively "teleported" to appear with the host image 204 within the background 206 of the host location.

Figures 3A, 3B:
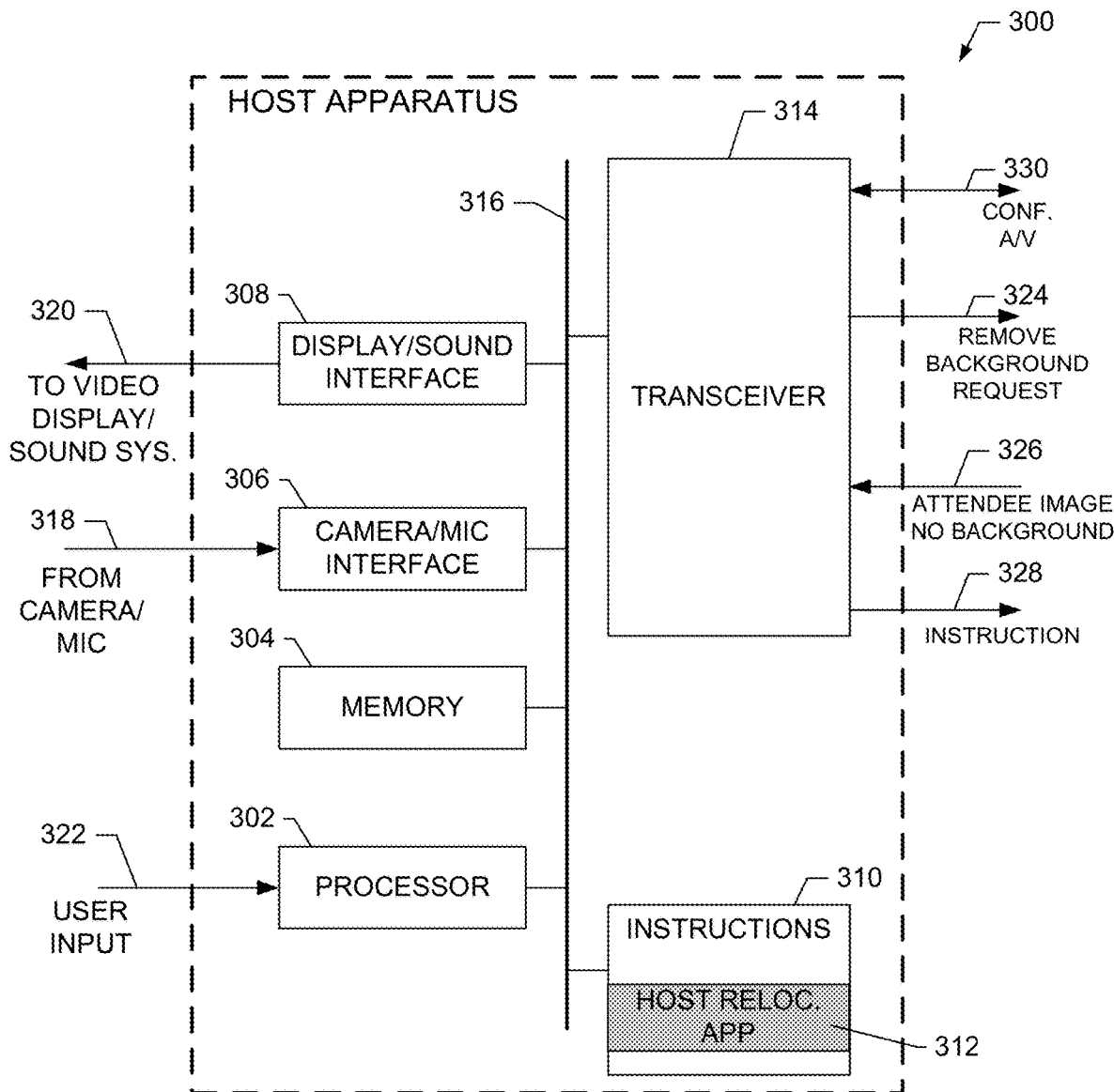
FIG. 3A shows a diagram of an exemplary host apparatus configured to provide embodiments of virtual relocation for use during a network conference.
FIG. 3B shows a diagram of an exemplary relocation instruction configured to provide embodiments of virtual relocation for use during a network conference.

FIG. 3A shows a diagram of an exemplary host apparatus 300 configured to provide embodiments of virtual relocation for use during a network conference. For example, the host apparatus 300 is suitable for use as the host UE 102 shown in FIG. 1 or the host UE 200 shown in FIG. 2. The host apparatus 300 comprises processor 302, memory 304, camera/microphone interface 306, display/sound interface 308, instructions 310, and transceiver 314 all connected to communicate over data bus 316. The instructions 310 include host relocation application 312 that is executed by the processor 302 to perform the functions of virtual relocation as described herein.

During operation, the processor 302 controls the camera/mic interface 306 to receive video/audio signals 318 from a camera and microphone mounted at the host equipment. A video signal received from the camera contains an image of the host user and a host background. The display/sound interface 308 is configured to output display/sound information 320 to a video display and sound system that are part of the host apparatus.

The processor 302 receives user input 322 (keyboard or mouse inputs) and uses this input to perform various functions of the apparatus. The transceiver 314 is used by the processor 302 to transmit and receive information during the network conference. For example, the processor 302 controls the transceiver 314 to transmit/receive conference audio and video information 330 between the host apparatus 300 and other conference participants during a network conference.

The processor 302 also controls the transceiver 314 to transmit a request to remove background 324 to one or more conference participants. The request to remove background 324 is used during the virtual relocation process. The transceiver 314 also receives an attendee image with no background 326 that is transmitted by an attendee in response to the request 324. In an embodiment, the attendee image with no background 326 is received as part of the conference A/V information 330. The processor 302 also controls the transceiver 314 to transmit an instruction 328 to conference attendees that describes how an attendee video stream is to be relocated within a host background image.

In an exemplary embodiment, the host apparatus 300 performs at least the following operations to provide virtual relocation during a network conference. For example, the processor 302 executes the host relocation application 312 to perform one or more of the following functions.

1. The processor 302 controls the transceiver 314 to enter into a network conference in which A/V signals 330 are exchanged with conference participants. For example, camera/microphone signals 318 are transmitted from the host apparatus and display/sound signals 320 are received from conference participants and reproduced at the host apparatus. In an embodiment, the camera/mic signal 318 includes a video stream having a host image and host background that is transmitted as the host video stream, for example, host video stream 214 shown in FIG. 2. In another embodiment, the host processor 302 obtains or generates another background onto which the host image is placed and then transmits this other background and host image as the host video stream. For example, a customized host background can be stored at the host apparatus or obtained from the server 104.

2. The processor 302 receives user input 322 indicating that a particular conference attendee is to be virtually relocated within the host background.

3. The processor generates a request to remove background 324 that is transmitted to the selected attendee. The request can be in any suitable instruction format.

4. In response to the request 324, the transceiver receives a modified attendee image with no background 326 from the selected attendee. The processor 302 control the display interface 308 to display the received modified image with no background on the host video display.

5. The processor receives user input 322 that describes how to relocate the modified image 326 within the host background. The processor 302 determines the location, size, orientation and other parameters of the relocated modified image based on the user input.

6. The processor 302 generates the instruction 328 that is transmitted to the conference participants. The instruction 328 describes how the modified attendee image 326 is relocated within the host background.

7. Each attendee system receives the modified attendee image 326 and the instruction 328 and relocates the modified image within the host background as it was done on the host system. Thus, all conference participants now see the selected attendee "teleported" to appear with the host image within the host background.

FIG. 3B shows a diagram of an exemplary relocation instruction 350 configured to provide embodiments of virtual relocation for use during a network conference. For example, in an embodiment, the instruction 350 is suitable for use as the instruction 126 shown in FIG. 1, the instruction 230 shown in FIG. 2, or the instruction 328 shown in FIG. 3A. The instruction 350 comprises parameters for one or more conference participants that have been virtually relocated. For example, the parameters 352 are associated with the relocation of conference participant A1 and the parameters 354 are associated with the relocation of conference participant A2 (if A2 is also relocated). Each set of parameters comprises a location (e.g., X and Y screen location) and size (e.g., height, width, aspect ratio, rotation, etc.) of the virtually relocated conference participant. Thus, upon receipt of the instruction 350, a conference participant is able to relocate the video streams of the identified conference participants within a host background.

Figure 4:
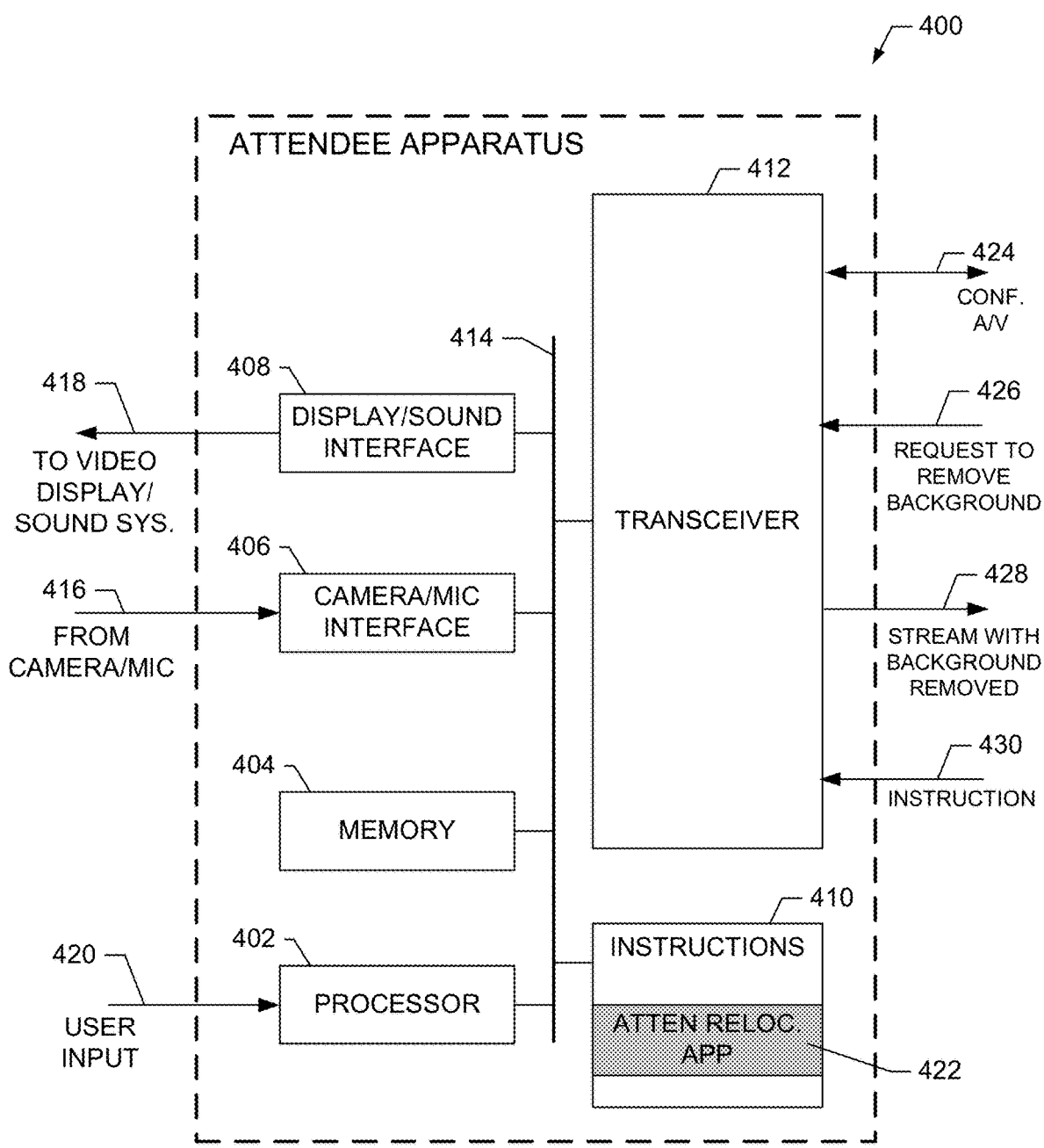
FIG. 4 shows an exemplary detailed embodiment of an attendee apparatus configured to provide embodiments of virtual relocation for use during a network conference.

FIG. 4 shows an exemplary detailed embodiment of an attendee apparatus 400 configured to provide embodiments of virtual relocation for use during a network conference. The attendee apparatus 400 is suitable for use as any of the attendee apparatus (A1-A2) shown in FIG. 1. In an embodiment, the attendee apparatus 400 comprises processor 402, memory 404, camera/microphone interface 404, display/sound interface 408, instructions 410, and transceiver 412 all connected to communicate over bus 414. The instructions 410 include an attendee relocation application 422 that is executed by the processor 402 to perform the functions of the attendee apparatus describe herein.

During operation, the processor 402 controls the camera/mic interface 406 to receive video/audio signal 416 from a camera and microphone mounted at the attendee equipment. The video signal from the camera contains an image of the attendee and an attendee background. The display/sound interface 408 is configured to output display/sound information 418 to a video display and sound information to a sound system that are part of the attendee apparatus.

The processor 402 receives user input 420 (keyboard and mouse inputs) and uses this input to perform various functions of the apparatus. The transceiver 412 is used by the processor 402 to transmit and receive information during the network conference. For example, the processor 402 controls the transceiver 412 to transmit and receive conference audio and video information 424 between the attendee apparatus 400 and other conference participants during a network conference.

The processor 402 also controls the transceiver 412 to receive a request to remove background 426 from the attendee's video stream. The request to remove background 426 is received during the virtual relocation process. In response to the request 426, the processor 402 performs any suitable background removal process on the attendee video stream to remove the attendee background to generate a modified attendee video stream with no background. For example, the processor 402 performs background subtraction or other background removal operations. The transceiver 412 also transmits the modified attendee video stream with no background 428 that is transmitted in response to the request 426. For example, the processor 402 performs a background removal process to generate the stream with background removed 428. The processor 402 also controls the transceiver 412 to receive an instruction 430 that describes how the attendee video stream 428 is to be relocated within a host background image.

In an exemplary embodiment, the attendee apparatus 400 performs at least the following operations to provide virtual relocation during a network conference. For example, the processor 402 executes the attendee relocation application 422 to perform one or more of the following functions.

1. The processor 402 controls the transceiver 412 to enter into a network conference in which A/V signals 424 are exchanged with conference participants. A host stream is received and displayed by the display/sound interface 408 on the attended video display. An attendee video stream is received by the camera/mic interface 406. The attendee video stream includes an attendee image and an attendee background. The attendee video stream is transmitted to the host UE as part of the conference A/V signals 424.

2. The processor 402 receives a request to remove background 426 that is received from a host device.

3. In response to the request 426, the processor 402 removes the background from the attendee video stream to generate a modified stream with background removed 428 that is transmitted to the host and other conference participants. In an embodiment, the processor 402 removes the attendee background from the attendee stream using any suitable background removal process to generate the modified attendee stream 428.

4. The processor 402 controls the transceiver to receive an instruction 430 that describes how the modified attendee video stream with no background 428 is to be relocated within the host background that is displayed on the attendee video display.

5. The processor 402 relocates the attendee stream with no background within the host background. The processor 402 determines the location, size, orientation and other parameters of the relocated image from the received instruction 430.

Thus, the attendee image has been "teleported" to appear with the host image within the host background.

Figure 5:
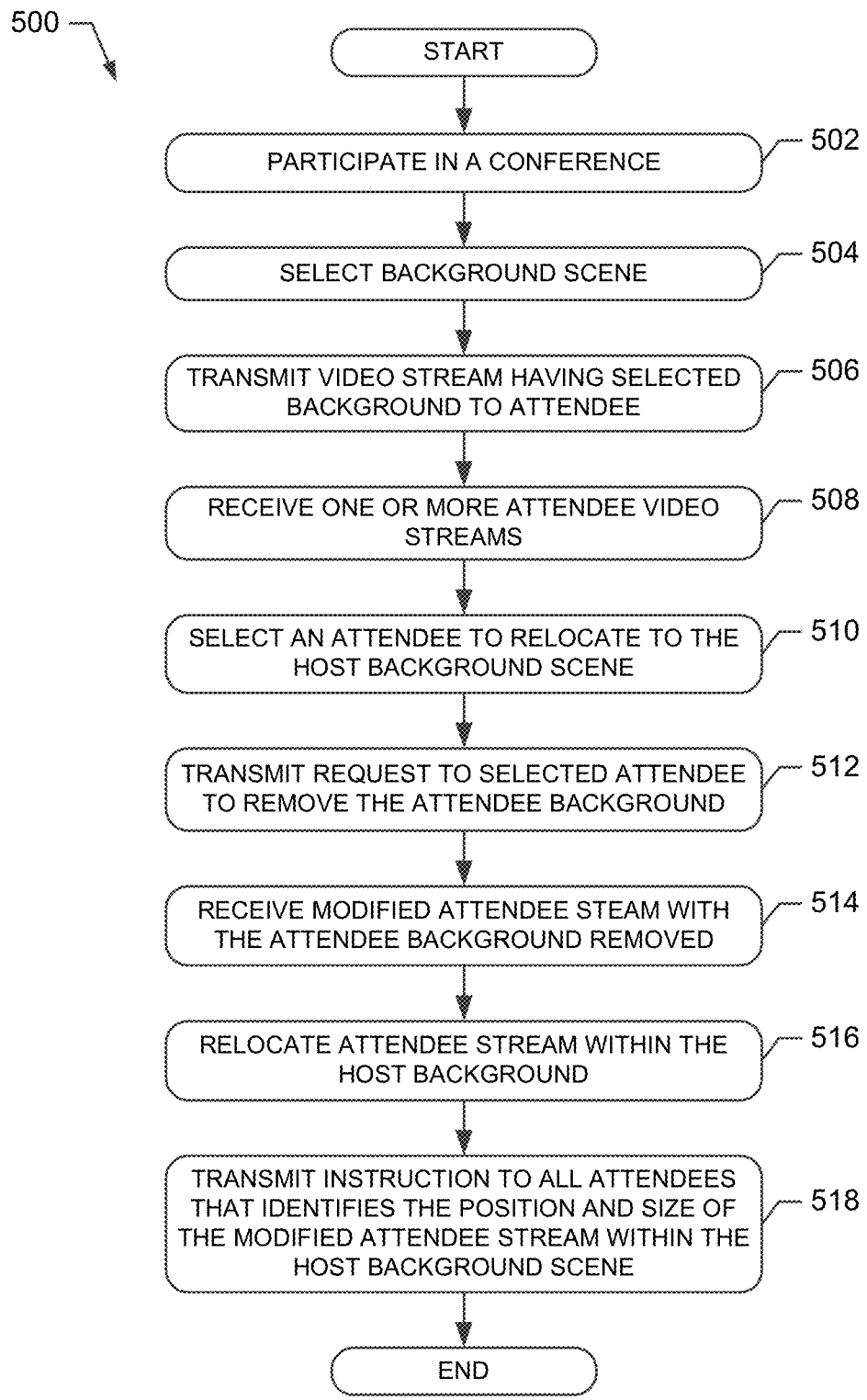
FIG. 5 shows an exemplary method for operating a host apparatus to provide embodiments of virtual relocation for use during a network conference.

FIG. 5 shows an exemplary method 500 for operating a host apparatus to provide embodiments of virtual relocation for use during a network conference. For example, in an embodiment, the method 500 is performed by the host apparatus 102 shown in FIG. 1, the host apparatus 200 shown in FIG. 2, or the host apparatus 300 shown in FIG. 3.

In an embodiment, the processor 302 of the host apparatus 300 executes the host relocation instructions 312 to perform the following operations At block 502, the host apparatus participates in a network conference. For example, the host 102 participates in a network conference with the attendee devices (A1-A2).

At block 504, the user of the host apparatus selects a background scene. For example, the user of the host apparatus 102 selects a background scene, which may be a real background captured by a camera or an inserted background scene or image.

At block 506, a host video stream is transmitted to attendees of the network conference. For example, the host 102 transmits a host video stream that includes a host image and a host background to the attended devices (A1-A2).

At block 508, the host apparatus receives one or more attendee video streams. For example, the host 102 receives video streams 112, 114 from the attendees (A1-A2), respectively.

At block 510, the host selects an attendee for virtual relocation to the background scene. For example, the processor 302 receives user input 322 that selects at least one of the attendees to be relocated.

At block 512, a request is transmitted from the host to the selected attendee requesting that the background of the attendee video stream be removed. For example, the processor 302, controls the transceiver 314 to transmit the request 324 to the selected attendee.

At block 514, a modified attendee video stream with the attendee background removed is received. For example, the transceiver 314 receives the modified attendee video stream 326 with the background removed.

At block 516, the received modified attendee video stream is relocated within the host background. For example, based on user input 322, the processor 302 relocates the modified attendee video stream 326 to appear at a selected location within the host background. As a result of the relocation, the location, size, aspect ratio, and other characteristics of the modified video stream are determined by the processor 302. For example, during the operation of relocating at least one of position, size, aspect ratio, and rotation of the modified video stream is adjusted to relocate the modified video stream within in the host background.

At block 518, an instruction is transmitted that includes the position, size, and aspect ratio of the relocated modified attendee video stream. For example, the processor 302 generates the instruction 328 and the transceiver 314 transmits the instruction 328 to the attendees of the network conference. The attendees utilize the instruction to relocate the position of the modified attendee stream 326 to match the location as shown in the host apparatus. As a result, the attendee image has been teleported or virtually relocated to appear with the host image within the host background.

Thus, the method 500 provides a method for operating a host apparatus to provide embodiments of virtual relocation for use during a network conference. It should be noted that the operations of the method 500 are exemplary and not limiting of the scope of the embodiments. Furthermore the operations of the method 500 can be changed, deleted, rearranged, added to, or otherwise modified within the scope of the embodiments.

Figure 6:
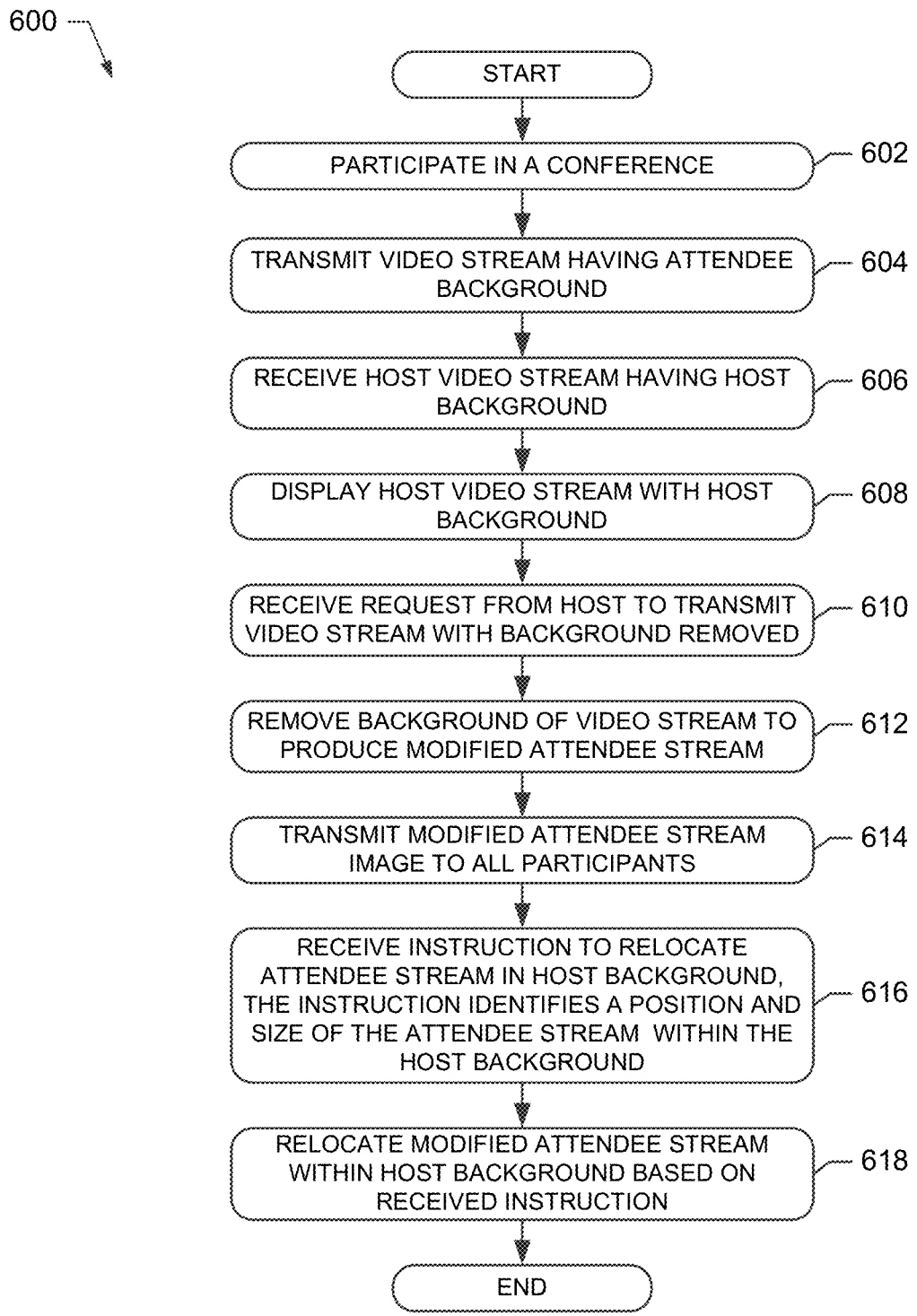
FIG. 6 shows an exemplary method for operating an attendee apparatus to provide embodiments of virtual relocation for use during a network conference.

FIG. 6 shows an exemplary method 600 for operating an attendee apparatus to provide embodiments of virtual relocation for use during a network conference. For example, in an embodiment, the method 600 is performed by any of the attendee apparatus (A1-A2) shown in FIG. 1 or by the attendee apparatus 400 shown in FIG. 4. In an embodiment, the processor 402 of the attendee apparatus 400 executes the attendee relocation application 422 to perform the following operations.

At block 602, the attendee apparatus participates in a network conference. For example, the attendee A2 participants in a conference with the host 102 and attendee A1.

At block 604, the attendee apparatus transmit a video stream having an attendee background. For example, the attendee apparatus A2 transmits the video stream 144 as part of the network conference.

At block 606, the attendee receives a host video stream having a host background. For example, the attendee A2 receives the host video stream that includes the host image 108 and host background 110.

At block 608, the attendee apparatus displays the host video stream with host background.

At block 610, the attendee apparatus receives request to transmit the attendee video stream with background removed. For example, the request 116 is received from the host 102.

At block 612, the attendee apparatus removes the background from the attendee video stream to generate a modified video stream. For example, the processor 402 performs a background removal process on the attendee video stream to remove the background to generate the modified attendee stream 118 or 428.

At block 614, the attendee apparatus transmits the modified attendee video stream to conference attendees. For example, the transceiver 412 transmits the modified attendee video stream with background removed 428 to conference participants including the host.

At block 616, the attended apparatus receives instruction to relocate the modified attendee stream within the host background. For example, the instruction 126 identifies a position and size of the modified attendee video stream within the host background. In an embodiment, the instruction is received from the host UE.

At block 618, the attendee apparatus relocates the modified attendee stream within host background based on the received instruction. For example, the attendee A2 relocates 130 the modified attendee stream 118 within the host background 110. During the operation of relocating at least one of position, size, aspect ratio, and rotation of the modified video stream is adjusted to relocate the modified video stream within in the host background.

Thus, the method 600 provides a method for operating an attendee apparatus to provide embodiments of virtual relocation for use during a network conference. It should be noted that the operations of the method 600 are exemplary and not limiting of the scope of the embodiments. Furthermore the operations of the method 600 can be changed, deleted, rearranged, added to, or otherwise modified within the scope of the embodiments.

Figure 7:
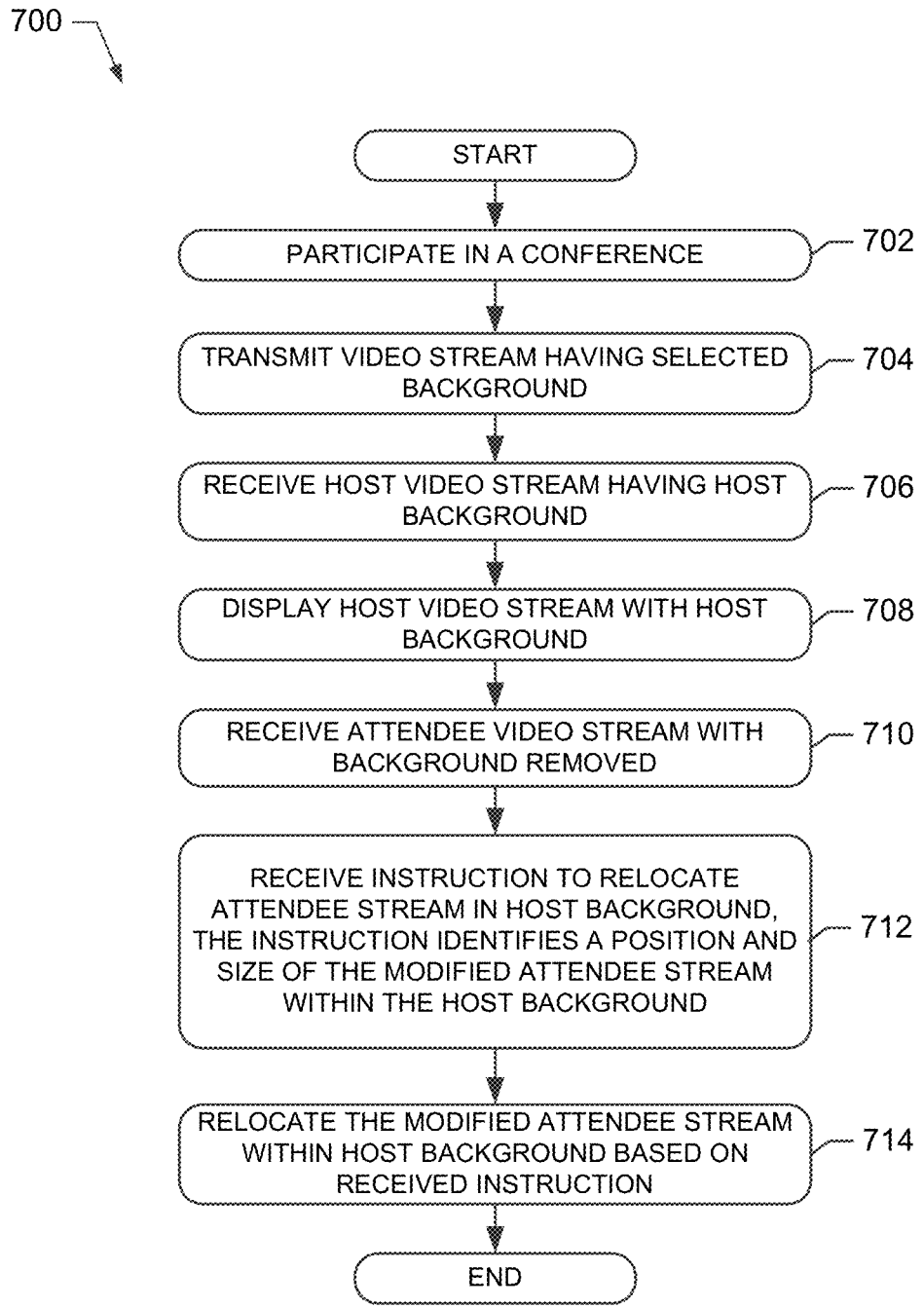
FIG. 7 shows an exemplary alternative method for operating an attendee apparatus to provide embodiments of virtual relocation for use during a network conference.

FIG. 7 shows an exemplary alternative method 700 for operating an attendee apparatus to provide embodiments of virtual relocation for use during a network conference. For example, in an embodiment, the method 700 is performed by the attendee apparatus A1 shown in FIG. 1 or by the attendee apparatus 400 shown in FIG. 4. It will be assumed that the attendee apparatus A1 performs the method 700 to relocate the attendee apparatus A2 within the host 102 background. In an embodiment, processor 402 of the attendee apparatus 400 executes the attendee relocations application 422 to perform the following operations.

At block 702, the attendee apparatus A1 participates in a network conference. For example, the attendee A1 participants in a conference with the host 102 and attendee A2 as shown in FIG. 1.

At block 704, the attendee apparatus transmit a video stream having an attendee background. For example, the attendee apparatus A1 transmits the video stream 112 during the network conference.

At block 706, the attendee apparatus receives a host video stream having a host background. For example, the attendee apparatus A1 receives the host stream having host image 108 and host background 110.

At block 708, the attendee apparatus displays the host video stream with host background. For example, the attendee apparatus A1 displays the host video stream.

At block 710, the attendee apparatus receives the attendee A2 modified video stream with background removed. For example, as a result of a request 116 transmitted from the host 102 to the attendee A2, the attendee A2 generates a modified attendee video stream with background removed 120 and transmits this stream to the conference participants including the attendee A1.

At block 712, the attendee apparatus receives an instruction that describes how to relocate the modified attendee stream in the host background. For example, the attendee apparatus A1 receives the instruction 126.

At block 714, the attendee apparatus relocates the modified attendee stream within host background based on the received instruction. For example, the attendee A1 receives the instruction 126, and based on this instruction, relocates the modified attendee A2 video stream 118 within the host background 110, as illustrated by operation 128. During the operation of relocating at least one of position, size, aspect ratio, and rotation of the modified video stream is adjusted to relocate the modified video stream within in the host background.

Thus, the method 700 provides a method for operating an attendee apparatus to provide embodiments of virtual relocation for use during a network conference. It should be noted that the operations of the method 700 are exemplary and not limiting of the scope of the embodiments. Furthermore the operations of the method 700 can be changed, deleted, rearranged, added to, or otherwise modified within the scope of the embodiments.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 310 or instructions memory 312. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise one or more buses. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, which carries the data to a memory, from which a processor retrieves and executes the instructions. The instructions may optionally be stored on a storage device either before or after execution by processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from the exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method for relocating a conference participant's video stream during a network conference, the method comprising:
   generating and transmitting, by a first conference participant device, a video stream comprising a background of the first conference participant device;
   receiving, at the first conference participant device, video streams from one or more additional conference participant devices;
   identifying a video stream of a selected conference participant;
   transmitting a request to the selected conference participant's device to remove a background from the video stream of the selected conference participant's device to generate a modified video stream;
   receiving, at the first conference participant device, the modified video stream from the selected conference participant's device;
   relocating, by the first conference participant device, the modified video stream within the background, wherein the operation of relocating comprises adjusting at least one of position, size, aspect ratio, and rotation of the modified video stream within the background of the first conference participant; and
   transmitting, by the first conference participant device, an instruction for relocating the modified video stream within the background of the first conference participant.

2. The method of claim 1, further comprising transmitting a video stream of the first conference participant device to the one or more additional conference participant devices, wherein the video stream of the first conference participant device includes the background of the first conference participant.

3. The method of claim 1, wherein the operation of identifying comprises identifying the video stream of the selected conference participant based on user input.

4. The method of claim 1, wherein the operation of transmitting comprises generating the instruction to identify at least one of position, size, aspect ratio, and rotation of the relocated updated video stream within in the background of the first conference participant.

5. The method of claim 1, wherein the operation of transmitting comprises transmitting the instruction to all conference participant devices including the participant device associated with the selected conference participant.

6. The method of claim 1, wherein the first conference participant device is a host of the network conference.

7. The method of claim 1, wherein the background of the first conference participant is at least one of a background captured by a camera or a stored background.

8. A host apparatus for relocating a conference participant during a network conference, the apparatus comprising:
   a transceiver configured to transmit and receive information with conference participants during a network conference; and
   a processor configured to:
      generate and transmit a host video stream that includes a host background;
      receive an identification of a participant video stream associated with a selected conference participant;
      receive the participant video stream associated with the selected conference participant;
      transmit a request to remove a background from the participant video stream to generate a modified video stream;
      receive the modified video stream;
      relocate the modified video stream within the host background, wherein the operation of relocating comprises adjusting at least one of position, size, aspect ratio, and rotation of the modified video stream within the host background; and
      transmit an instruction for relocating the modified video stream within the host background.

9. The apparatus of claim 8, wherein the processor is configured to transmit the host video stream to the conference participants.

10. The apparatus of claim 8, wherein the processor is configured to identify the video stream of the selected conference participant based on user input.

11. The apparatus of claim 8, wherein the processor generates the instruction to identify at least one of position, size, aspect ratio, and rotation of the modified video stream within in the host background.

12. The apparatus of claim 8, wherein the processor is configured to transmit the instruction to all conference participants.

13. The apparatus of claim 8, wherein the host background is at least one of a background captured by a camera and a stored background.

14. A non-transitory computer readable medium on which are stored program instructions that, when executed by one or more processors, cause the one or more processors to perform operations of:
- generating and transmitting, by a first conference participant device, a video stream comprising a background of the first conference participant device;
- receiving, at the first conference participant device, video streams from one or more conference participant devices;
- identifying a video stream of a selected conference participant;
- transmitting a request to a participant device associated with the selected conference participant to remove a background from the video stream of the selected conference participant to generate a modified video stream;
- receiving, at the first conference participant device, the modified video stream from the participant device associated with the selected conference participant;
- relocating, by the first conference participant device, the modified video stream in the background, wherein the operation of relocating comprises adjusting at least one of position, size, aspect ratio, and rotation of the modified video stream within the background of the first conference participant; and
- transmitting, by the first conference participant device, an instruction for relocating the modified video stream within the background of the first conference participant.

15. The non-transitory computer readable medium of claim 14, wherein the instructions cause the one or more processors to perform an operation of identifying the video stream of the selected conference participant based on user input.

16. The non-transitory computer readable medium of claim 14, wherein the instructions cause the one or more processors to perform an operation of generating the instruction to identify at least one of position, size, aspect ratio, and rotation of the relocated updated video stream within in the background of the first conference participant.

17. The non-transitory computer readable medium of claim 14, wherein the instructions cause the one or more processors to perform an operation of transmitting the instructions to all conference participants including the selected conference participant.

* * * * *